May 6, 1958
W. B. BARNES ET AL
2,833,154
TORQUE AMPLIFIER UNIT
Filed Sept. 27, 1952
3 Sheets-Sheet 3
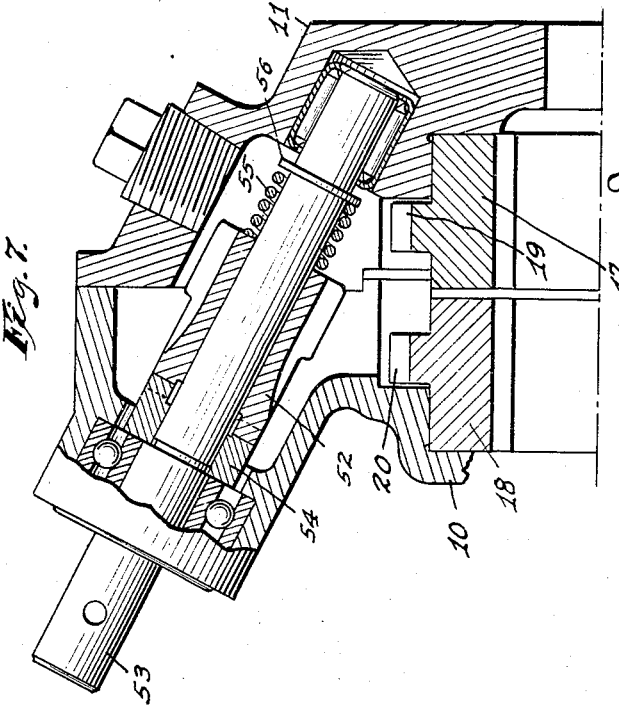
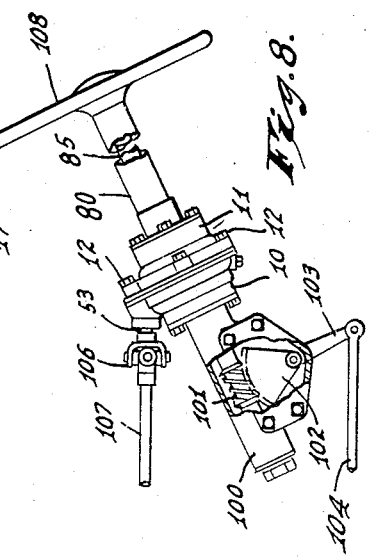
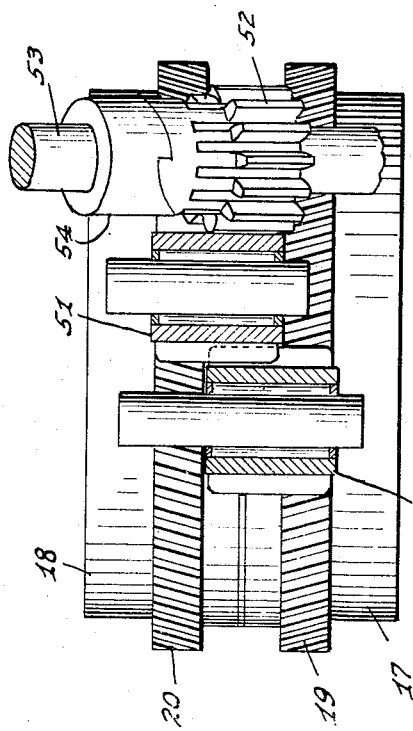
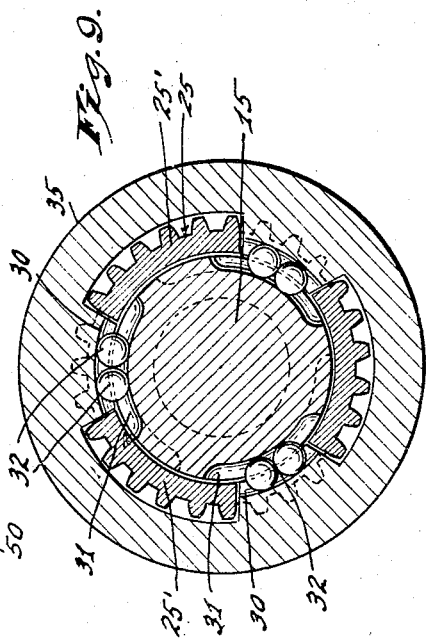
INVENTORS
WILLIAM B. BARNES and
BY WILLIAM A. BARNES,
ATTORNEYS.

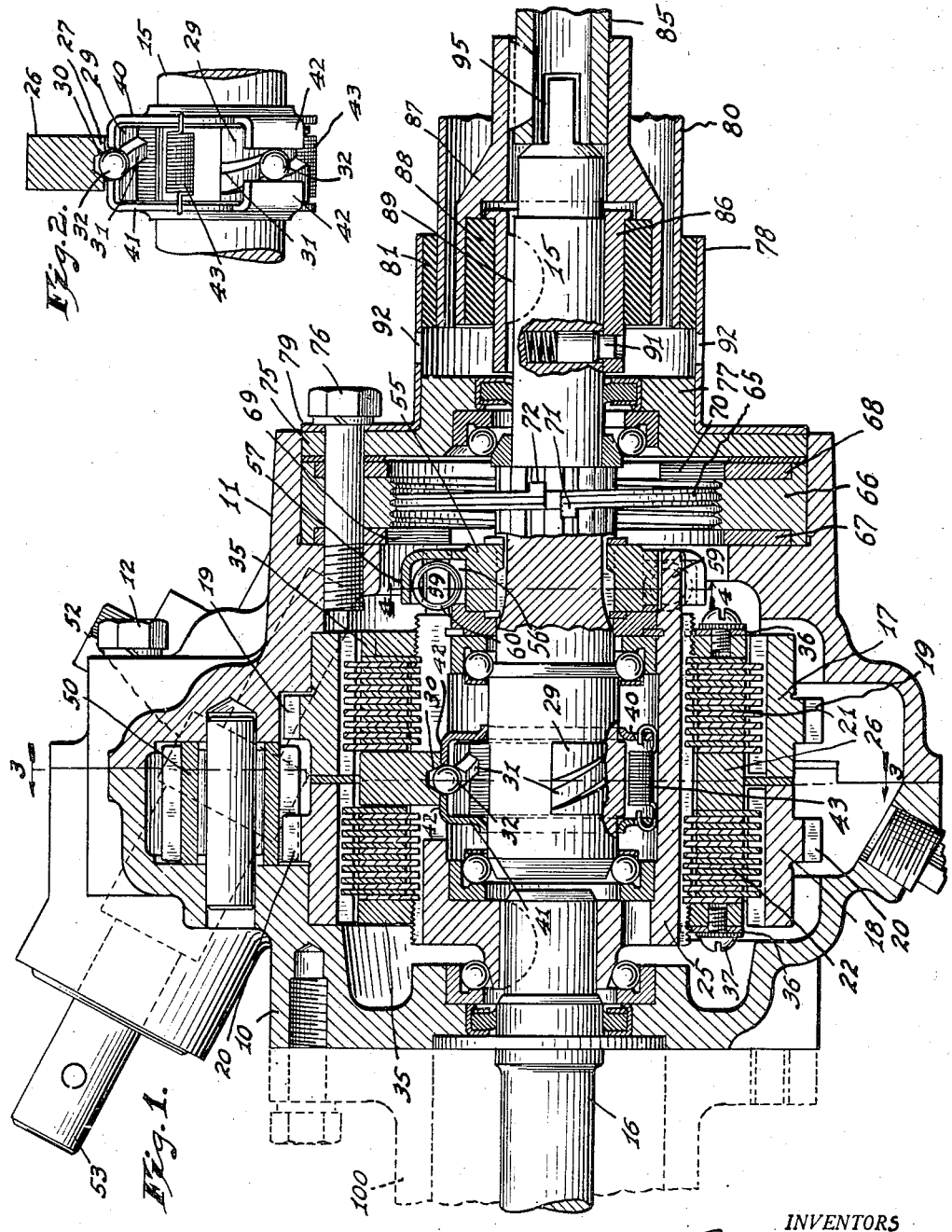

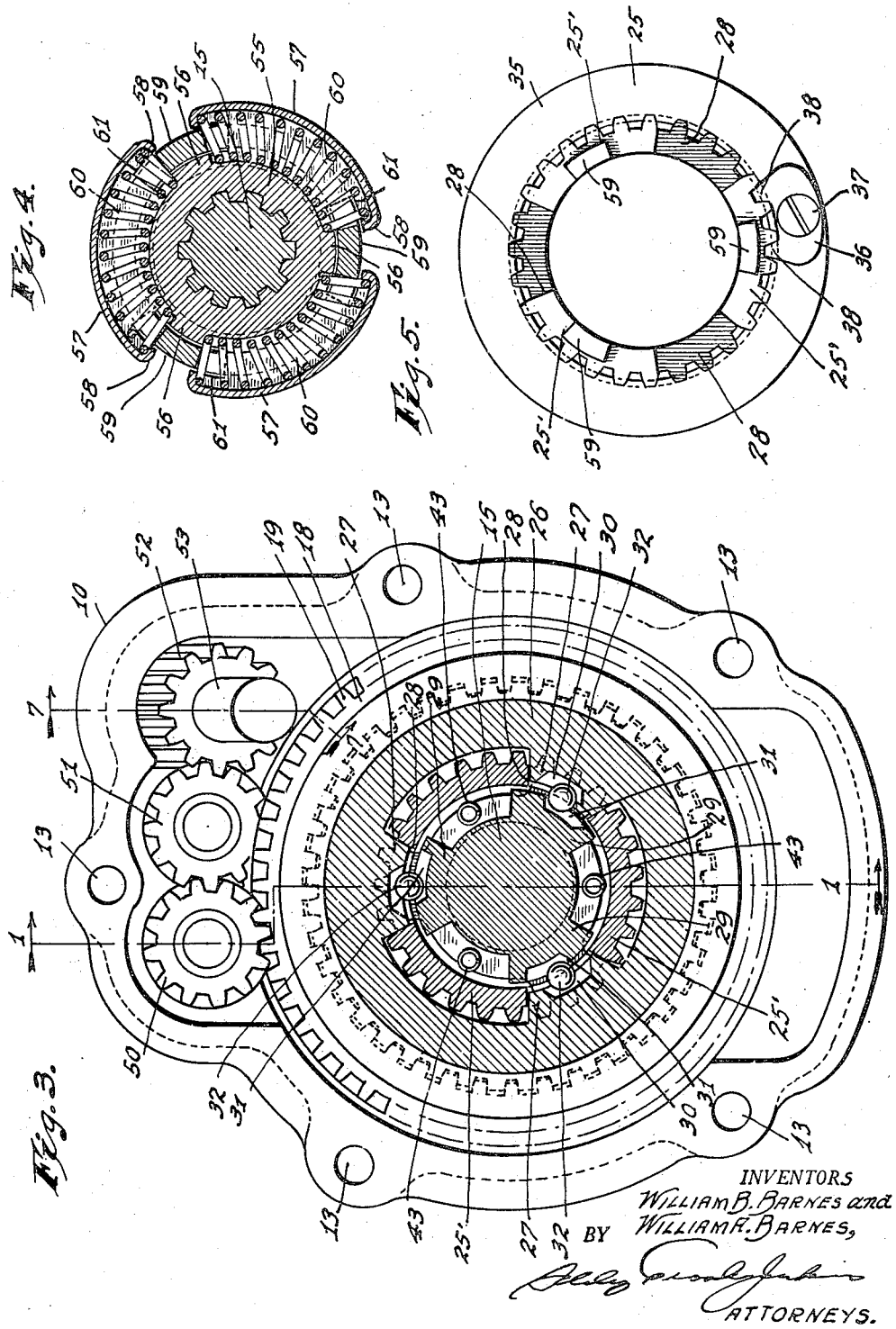

United States Patent Office 2,833,154
Patented May 6, 1958

2,833,154

TORQUE AMPLIFIER UNIT

William B. Barnes and William A. Barnes, Muncie, Ind.

Application September 27, 1952, Serial No. 311,894

7 Claims. (Cl. 74—388)

This invention relates to a torque-amplifier unit adapted to apply torque to a rotatable driven member from an external source of power whereby to assist the rotation of such driven member when the torque applied to it from another source attains a predetermined maximum. The amplifier will be illustrated and described herein as embodied in an automobile steering gear for the purpose of assisting the operator in the application of steering effort; but it is to be understood that the invention, in its broader aspects, has other uses.

It is an object of the invention to produce a torque amplifier which will permit free rotation of the driven element by torque received directly from the driving element until such torque reaches the predetermined maximum and which will then apply to the driven element torque derived from an outside source of power independently of the driving element. Another object of the invention is to limit the application of power from the outside source to rotation of the driving element through a predetermined range. Still another object of the invention is to produce an improved means for actuating clutches by which the driven element is connected to the outside source of power, when the torque applied by the driving element exceeds the predetermined maximum. A further object of the invention is to produce a torque amplifier in which torque from the outside source will be applied gradually and without perceptible shock.

In carrying out the invention, the driving element and driven element are interconnected through a preloaded yielding means capable of transmitting torque without yielding up to a predetermined maximum depending upon the degree of preloading, the arrangement being such that when such maximum torque is exceeded the driving and driven members rotate relatively to each other from a normal relative position toward which the yielding means biases them. We provide two oppositely rotating, power driven members, each connectable to the driven member through a friction clutch, such clutches being selectively operable by means responsive to relative rotation, in one direction or the other, of the driving and driven elements. A preferred means for actuating the clutches comprises a pressure plate movable in one axial direction to cause engagement of one clutch and in the opposite direction to cause engagement of the other clutch, such pressure plate being rotatable with the driven member. The driving member and the pressure plate are provided with helical grooves which co-operate with each other through the medium of interposed balls to effect axial movement of the pressure plate upon relative rotation of the driving and driven members. Means may be provided for maintaining the balls in a normal position with respect to the helical grooves when the pressure plate is ineffective to actuate either clutch.

For the purpose of preventing application to the driven member of torque derived from the outside source of power when the driven member has attained either limit of its range of movement, we may provide in association with the driving member a collar which rotates with the driving member but is axially movable therealong. Such collar has a screw-thread engagement with a stationary element which causes it to move axially as it rotates; and at axially spaced points along the path of collar movement we provide abutments engageable with the collar in the rotation thereof to limit its rotation.

A preferred form of preloaded yielding means interconnecting the driving and driven elements for joint rotation at and below torques equal to the predetermined maximum takes the form of a series of circumferentially extending compression springs each of which, at each end, engages abutments on the driving and driven elements. Each spring has a normal length when unstressed greater than the circumferential distance between the two abutments on each of the driving and driven members which engage its ends, so that the springs will be compressed when in position. As long as the torque transmitted between the driving and driven members is less than that necessary to effect further compression of the springs, the driven and driving members rotate as a unit; but if the torque exceeds that value, the springs yield and permit the relative rotation of the driving and driven elements which is necessary to move the pressure plate in one direction or the other and engage one of the clutches above referred to.

Preferably, each friction clutch is adjusted to transmit a slight torque to the driven member when the driven member occupies its normal position with respect to the driving member.

The accompanying drawings illustrate the invention:

Fig. 1 is an axial section through the torque-amplifier unit on the line 1—1 of Fig. 3;

Fig. 2 is a fragmental view illustrating portions of the mechanism employed to actuate the pressure plate which controls the two clutches;

Fig. 3 is a transverse section on the line 3—3 of Fig. 1;

Fig. 4 is a transverse section on the line 4—4 of Fig. 1 illustrating details of the preloaded yielding means which act between the driving and driven elements;

Fig. 5 is an end elevation of a portion of the clutch mechanism illustrating means suitable for use in adjusting the clutches;

Fig. 6 is a plan view of a portion of the driving mechanism;

Fig. 7 is a fragmental section on the line 7—7 of Fig. 3;

Fig. 8 is an elevation illustrating the torque-amplifier embodied in an automobile steering mechanism; and Fig. 9 is a fragmental view similar to Fig. 3 illustrating a modified form of clutch-actuating mechanism.

The amplifier unit shown in the drawing embodies a housing comprising two axially separable parts 10 and 11 adapted to be secured together as by means of bolts 12 extending through holes 13 (Fig. 3) in abutting flanges on the two housing-portions. Rotatably supported in the housing are co-axial driving and driven members 15 and 16, respectively. Also rotatably supported in the housing and co-axial with the driving and driven members are a pair of annular members 17 and 18 provided respectively with external gear teeth 19 and 20 through which they are adapted to be driven in opposite directions from an outside source of power.

Associated respectively with the members 17 and 18 are clutches 21 and 22 through each of which the associated member may be drivingly connected to the driven shaft 16. As shown, each of the clutches 21 and 22 is of the multiple disk type and comprises two sets of alternating disks one set of which is splined to the associated member 17 or 18 and the other set of which is splined to a sleeve 25 which is rigidly mounted at one end on the shaft 16 and which extends axially therefrom over the adjacent end of the driving shaft 15. The internal diameter of the sleeve 25 is substantially greater than the diameter of the end of the shaft 15 which it receives in order to provide space for the clutch-actuating mechanism now to be described.

The clutch-actuating mechanism comprises a ring or pressure plate 26 which surrounds the sleeve 25 and which is axially movable in either direction to actuate one or the other of the clutches 21 and 22. At equal angular intervals, the ring 26 is provided with lugs 27 which project inwardly into longitudinal slots extending through the wall of the sleeve 25, and dividing such sleeve into parallel fingers 25'. The shaft 15 is provided with a set of angularly spaced bosses 29 arranged in opposed relation to the lugs 27 of the ring 26. The opposed faces of the lugs 27 and bosses 29 are provided with helically extending grooves 30 and 31, and an antifriction element in the form of a ball 32 is received in each pair of grooves 30 and 31. The arrangement is such that upon relative rotation of the shaft 15 and the ring 26 the balls 32 will roll along the grooves and cause an axial displacement of the pressure plate 26 to actuate one or the other of the clutches 21 and 22. For the purpose of adjusting each of the clutches 21 and 22, clutch-adjusting rings 35 are screw-threadedly mounted on the ends of the sleeve 25. A locking plate 36 removably secured to each ring 35, as by a screw 37, has teeth 38 which engage with the splines of the sleeve 25 to lock the associated ring in any position of adjustment.

To provide a normal or neutral axial position for the clutch-actuating ring 26 and to prevent the balls 32 from working toward the ends of the grooves which receive them, the device illustrated in Fig. 2 may be employed. Such device comprises a pair of ball-locating members 40 and 41 surrounding the shaft 15 on opposite sides of the bosses 29. The locating members 40 and 41 are provided with inbent flanges 42 which extend axially into the space between the lugs 27 and bosses 29 in position to engage the balls 32. Tension springs 43 act between the locating members 40 and 41 urging them toward each other. The arrangement of the parts described is such that with the locating members 40 and 41 in engagement with the bosses 29 the distance between the opposed inner ends of each pair of flanges 42 will approximate the diameter of the balls 32. The flanges 42 on the two members 40, 41 are of substantially equal axial extent so that when such locating are in contact with the bosses 29 each ball 32 will be located near the midpoints of its associated grooves 30 and 31. Upon relative rotation of the shaft 15 and ring 26, the balls 32, rolling along the helically disposed grooves which receive them, will be axially displaced to displace, in turn, not only the pressure plate 26 but also one or the other of the locating members 40 and 41. As the other locating member will be prevented from participating in such axial movement by virtue of its engagement with the bosses 29, the springs 43 will be stretched and will urge the balls 32 toward their respective normal positions at the midpoints of the helical grooves. In general, whenever the balls are displaced from the midpoints of the helical grooves which receive them, one or the other of the actuating members 40 and 41 will urge the balls toward such midpoints.

For the purpose of driving the two members 17 and 18 in opposite directions, we may employ the arrangement illustrated in Figs. 1, 3, 6, and 7. As there shown, axially offset pinions 50 and 51 mesh with each other and, respectively, with the teeth 19 and 20 on the members 17 and 18. As will be obvious, a driving effort applied to either of the pinions 50 and 51 will cause them to rotate in opposite directions and to drive the members 17 and 18 in opposite directions. Power for so driving the pinions and the members 17 and 18 is shown as applied to the pinion 51 through the medium of a meshing drive pinion 52 mounted on a shaft 53 adapted to be driven from any convenient source of power. For a purpose which will hereinafter become apparent, the pinion 52 is connected to the shaft 53 through a unidirectional clutch. As shown, such clutch is of the ratchet type comprising co-operating ratchet teeth provided respectively on the gear 52 and on a collar 54 secured to the shaft 53. The pinion 52 is axially slidable and freely rotatable on the shaft 53 and is urged toward clutching engagement with the collar 54 by a compression spring 55 which surrounds the shaft 53 and, acting between an abutment 56 thereon and the pinion 52 biases the latter toward driving engagement with the clutch collar 54.

In the normal or neutral condition of the structure as so far described, the clutch-actuating ring or pressure plate 26 is in its neutral position in which both clutches 21 and 22 are disengaged. If the shaft 53 is rotated by power from a suitable exterior source, the two members 17 and 18 will be driven in opposite directions; but as both clutches 21 and 22 are disengaged no torque will be applied through the sleeve 25 to the driven shaft 16. Upon the application of a torque to the drive shaft 15, such shaft will tend to rotate relatively to the driven shaft 16 and sleeve 25; and if a resisting torque exists on the shaft 16, the latter shaft will remain stationary while the shaft 15 rotates. The ring 26 will be held rotatably stationary by reason of the engagement of the lugs 27 in the slots 28 of the sleeve 25, and the balls 32 will therefore be displaced axially to displace the clutch-actuating ring 26 and actuate one or the other of the clutches 21 and 22 depending upon the direction in which the shaft 15 was rotated. Upon actuation of such clutch, the associated member 17 or 18 becomes drivingly connected to the shaft 16, which rotates under power supplied from the shaft 52 as long as the shaft 15 continues to rotate. When the driving shaft 15 comes to rest, the driven shaft 16 continues to rotate momentarily, carrying with it the clutch-actuating ring 26, thus restoring the shaft 16 to its normal position relative to the shaft 15 and moving the plate 26 to disengage the previously engaged friction clutch.

In many instances it is desirable to provide for the transmission of some torque between the shafts 15 and 16 without calling for the application of power from the shaft 53. To accomplish this result, a yielding torque-transmitting mechanism may act operatively between the driving and driven shafts 15 and 16, such mechanism being prestressed to convey torques up to a predetermined maximum without permitting relative rotation of the shafts 15 and 16 and consequent clutch-actuating displacement of the ring 26. A preferred form of such a yieldable torque-transmitting mechanism is illustrated in Figs. 1 and 4.

As indicated in Figs. 1 and 4, a collar 55 is secured to the shaft 15 adjacent the end of the sleeve 25. Such collar has a hub portion grooved to provide spaced abutments 56 and also has segmental flanges 57, the end portions of which are turned inwardly to form abutments 58 each approximately coplanar with one side face of an abutment 56 on the collar-hub. Extensions 59 on the sleeve 25 respectively overlie the abutments 56, as will be clear from Fig. 4. Associated with each of the segmental flanges 57 is a compression spring 60 confined to an arcuate shape by the flange and extending circumferentially between the abutments 58 at the ends of the flange. The side walls of the flanges 57 are recessed at their ends, as indicated at 61 in Fig. 4, to provide clearance for the extensions 59 whereby to permit a limited rotation of the collar 55 and sleeve 25. The springs 60, which are compressed when in position, are accessible for engagement by the sleeve extensions 59 between the abutments 56 and 58.

Fig. 4 illustrates the condition existing when no torque is being transmitted from the driving shaft 15 to the driven shaft 16 through the sleeve 25. If a torque is applied to the shaft 15, such torque would be transmitted by way of the abutment 56, springs 60, sleeve extensions 59 and sleeve 25 to the driven shaft 16. So long as such torque is insufficient to stress the springs 60 beyond the extent to which they are stressed by virtue of their confinement between the several sets of abutments 56 and 58, the shaft 15, collar 55, springs 60, sleeve 25, and shaft 16 will rotate as a unit. Since the plate 26 rotates with the sleeve 25 there will be no tendency of the balls 32 to displace the plate in either direction, and both clutches 21 and 22 will remain disengaged. However, if the resistance of the shaft 16 to rotation is great enough, so that the torque transmitted through the springs 60 stresses them beyond the extent represented by their initial compression, those springs will yield and permit the shaft 15 to rotate relatively to the shaft 16, sleeve 25 and pressure plate 26. When this occurs, the balls 32 act in the manner above described to move the pressure plate 26 and actuate that one of the clutches 21 and 22 which will serve to connect to the shaft 16 the member 17 or 18 rotating in the same direction as the shaft 15. In order to maintain either of the clutches 21 and 22 engaged, the torque transmitted through the springs 60 must always be great enough to stress the springs beyond the extent represented by their initial state of compression between the sets of abutments 56 and 58.

Heretofore, it has been assumed that the torque amplifier is to be used only to cause power-assisted rotation of the driven shaft 16 under control of the shaft 15. The amplifier, however, is equally effective in holding the shaft 16 in substantially fixed position until the shaft 15 is rotated. For example, with both the clutches 21 and 22 disengaged, any tendency of the shaft 16 to rotate while the shaft 15 is held stationary will be reflected in torque-transmission through the springs 60. When the torque so transmitted exceeds that necessary to compress the springs 60 beyond their initial state of compression, the springs will yield and permit the shaft 16, sleeve 25, and ring 26 to rotate slightly relative to the shaft 15, which is assumed to be held stationary. Upon such relative rotation, the balls 32 act to displace the pressure plate 26 and to cause such plate to actuate the clutch which will transmit to the shaft 16 a torque opposing that which had caused such ring to rotate. Torque applied to the shaft 16 by the actuated clutch will tend to reduce the torque transmitted through the springs 60; and if the torque which initially caused rotation of the shaft 16 persists, a condition of equilibrium will be established in which the actuated clutch will slip and apply to the shaft 16 only the torque required to hold such shaft stationary.

For convenience of explanation, the above description of operation assumes that both clutches 21 and 22 are disengaged when the shafts 15 and 16 are in their normal relative position. In practice, we have found it advantageous to adjust the members 35 in such a manner that neither clutch is completely disengaged in the normal condition of the shafts 15 and 16. As a result, when that normal condition exists, torques of low magnitude will be transmitted through the clutches to the driven shaft 16; and as those torques will be substantially equal and of opposite direction, they will counteract each other. Slight axial clearances of the balls 32 in their associated grooves 30 and 31, permitting the ring 26 to float axially, is often beneficial in equalizing the opposed torques. So long as torque transmitted from the driving to the driven shaft is insufficient to overcome the prestressing of the springs 60, the opposite torques applied through the clutches will remain in balance; but, if the springs 60 yield, the clutch-actuating mechanism will urge the pressure plate 26 axially to render one clutch less effective (or completely ineffective) and the other clutch more effective, thus imposing on the driven shaft a net or resultant torque serving to rotate such shaft in the desired direction. We find that this adjustment of the clutches promotes smooth operation and reduction of shock when the springs 60 yield.

It sometimes happens in a device of the type described that positive limits are imposed on rotation of the shaft 16 or on movement of parts driven by such shaft. It would of course be inadvisable to continue the application of power to the shaft 16 through one or the other of the clutches 21 and 22 after such shaft has reached the positively imposed limit of its movement. If the range of movement of the shaft 16 is less than a complete revolution, the condition described can be avoided by merely providing for the shaft 15 suitable stops or abutments which will limit its rotation to the same extent. However, if the limits imposed on rotation of the shaft 16 are such as permit revolution of that shaft through more than a full turn, such a simple stop mechanism cannot be employed in association with the shaft 15.

When the shaft 16 has a positively limited range of movement beyond one full revolution in extent, and when it is desired to prevent the application of power to such shaft after it has attained either limit of its movement, the stop mechanism illustrated in Fig. 1 may be employed in association with the shaft 15. As there shown, a disc 65 is splined to the shaft 15 to rotate therewith but to be axially movable therealong. The disc 65 has external screw-threads for cooperation with internal screw-threads provided on a stationary collar 66 supported in the housing-portion 11. Also mounted within the housing-portion 11, and on opposite sides of the collar 66, are a pair of stop members 67 and 68 provided respectively with abutments 69 and 70 having circumferentially presented faces. On opposite sides of the disc 65, such disc is formed to provide stop-shoulders 71 and 72 adapted to be brought into engagement with the abutments 69 and 70 respectively by rotation of the disc 65 when, in axial movement of the disc 65, the stop-shoulder thereon is in axially overlapping relation with the co-operating stationary abutment.

The elements of the stop mechanism are illustrated in Fig. 1 in the positions occupied when the shaft 16 is at or near the midpoint of its range of rotative movement. If the shaft 15 is rotated to cause rotation of the shaft 16, the screw-threaded connection between the disk 65 and stationary collar 66 will cause the disc to move axially of the shaft 15 as it rotates therewith. The stop-shoulders 71 and 72 and the abutments 69 and 70 will be ineffective to limit rotation of the shaft 15 until the disk 65 has been displaced axially to an extent sufficient to bring one or the other of the stop-shoulders 71 and 72 into axially overlapping relation with its associated abutment 69 or 70. If rotation of the shaft continues beyond that point, the stop-shoulder will engage its associated abutment and limit further rotation of the shaft 15. By varying the number of effective screw-threads in the collar 66 or the angular positions of the abutments 69 or 70, the rotation of the shaft 15 can be limited to any desired extent. The interengaging surfaces of either stop-shoulder 71 and 72 and its co-operating abutment 69 or 70 are substantially normal to the direction of relative movement which brings those faces into positive engagement with each other; and there therefore is no wedging or jamming action which would oppose release and reverse rotation of the disk 65 and shaft 15.

A suitable arrangement for supporting the ring 66 and stop members 67 and 68 is shown in Fig. 1. As there indicated, the ring 66 is counterbored in its opposite faces to receive the stop members 67 and 68; and the assembly of ring and stop members is received in the counterbored outer end of the housing-portion 11. A cap 75 closes the outer end of the counterbore in the housing-portion 11, and screws 76 pass through aligned holes into the cap 75, ring 66, and stop members 67 and 68 into screw-threaded holes provided in the housing-portion 11 at the bottom of the counterbore therein.

Fig. 1 illustrates the torque-amplifier as adapted for embodiment in the steering gear of an automotive vehicle. As there shown, the cap 75 has an outwardly projecting axial boss 77 serving as a pilot for a sheet-metal sleeve 78 having an out-turned annular flange 79 provided with holes throught which the screws 76 may pass to hold the sleeve in place. At its outer end, the sleeve 78 receives and supports the adjacent end of a tubular steering post 80. Desirably, a sound-insulating sleeve 81 of rubber or similar material is interposed between the steering post and the sleeve 78.

The driving shaft 15 of the torque-amplifier is shown in Fig. 1 as extending outwardly beyond the boss 77, and as being there drivingly interconnected with a steering shaft 85 located within the steering post 80. Desirably, the driving connection between the shaft 15 and the steering shaft 85 is effected through the medium of a sound-insulating coupling comprising inner and outer sleeves 86 and 87 bonded respectively to the inner and outer surfaces of a ring 88 formed of rubber or other equivalent yielding material. To permit ready separation of the steering shaft 85 from the torque-amplifier unit, the inner sleeve 86 of the coupling is freely slidable on the outer end of the shaft 15, but is held against rotation relative thereto as by means of a key 89. For the purpose of releasably holding the coupling on the shaft 15, the latter is provided with a diametrically extending hole which slidably receives an outwardly spring-pressed, shouldered pin 91, the outer end of which is receivable in a hole provided in the inner coupling-sleeve 86. One or more holes 92, provided in the sleeve 78 in the plane of the pin 91, permit access by a rod or other implement by which the pin 91 can be forced inwardly until it clears the sleeve 86, whereupon the coupling 86—87 may be removed from the shaft.

To guard against the possibility of accident occuring from failure of the rubber sleeve 88 or of its connection to either of the sleeves 86 and 87, the adjacent ends of the shafts 15 and 85 may be interconnected by a jaw clutch 95. Such clutch, if used, will provide sufficient lost motion to ensure that the normal torque transmitted from the shaft 85 to the shaft 15 will be transmitted through the yielding sleeve 88, so that the jaw clutch 95 will come into action only in event of failure of the driving connection provided by the yielding sleeve 88.

In Fig. 8, we have shown the torque-amplifier as embodied in the steering mechanism of an automobile. As there indicated, the torque-amplifier is interposed between the steering shaft 85 and a speed reducing mechanism 100, which may be of any desired type. As shown, such mechanism is of the worm and sector type comprising a worm 101 concentric with the torque-amplifier unit and a sector 102 rigid with an arm 103 which is connected to the conventional drag link 104 of an automobile steering mechanism. In such an arrangement, the worm 101 is integral or otherwise rigid with the driven shaft 16 of the amplifier unit. The power-input shaft 53 is adapted for operative connection, as through a flexible coupling 106 and a shaft 107, to the engine of the automobile. A conventional steering wheel 108 is secured to the upper end of the steering shaft.

The operation of the complete steering mechanism shown in Fig. 8, which should reasonably be apparent from the above described operation of the amplifier unit, will be briefly summarized. With the shaft 107 connected to the automobile engine the two clutch members 17 and 18 will rotate continuously in opposite directions. The steering effort applied to the steering wheel will be transmitted through the steering shaft 85, shaft 15, springs 16, sleeve 25 and shaft 16 to the worm 101, rotation of the worm causing swinging of the sector 102 and steering movement of the drag link 104. So long as the steering effort is insufficient to cause compression of the springs 60, the power operated mechanism does not come into play and the vehicle steers in substantially the same manner as if the torque-amplifier unit were not incorporated. However, if steering effort becomes sufficient to cause compression of the springs 60 and relative rotation of the shaft 15 and sleeve 25, one or the other of the clutches will be actuated and the steering effort supplied by the operator will be augmented by power transmitted to the unit through the shaft 107.

The unidirectional clutch provided between the shaft 53 and pinion 52 permits unimpeded manual operation of the steering gear in the event of failure of any of the means through which power is applied to the shaft 53. Assume, for example, that the shaft 107 is not rotating. For any steering effort below that necessary to compress the springs 60, failure of the shaft 107 to rotate will have no effect; for neither of the multiple-disk clutches will be effectively engaged. However, should the steering effort exceed that necessary to compress the springs 60, the clutch-actuating mechanism will operate to cause effective engagement of one or the other of the multiple-disk clutches, thereby tending to cause rotation of the pinions 50, 51, and 52. In the absence of the unidirectional clutch between the pinion 52 and shaft 53, the shaft 53 would also tend to rotate; and if its rotation were prevented for any reason, the entire steering mechanism would be locked. However, with the overrunning clutch interposed between the pinion 52 and shaft 53, the pinion 52 is freely rotatable under any driving effort imposed upon it through the pinion 51. Accordingly, even if the shaft 53 is locked against rotation, the steering gear may be manually operated.

In Fig. 9, we have shown a modified form of clutch-actuating mechanism. In that construction, the ball-locating members 40 and 41 are eliminated, and two balls 32 are provided in each pair of co-operating helical grooves 30 and 31. The fingers 25' of the sleeve 25 effectively close the ends of the grooves 31 and serve as a ball-retainer or separator. Since there is no need in this construction to provide spaces for the springs 43, the bosses 29 of Fig. 1 may be replaced by a continuous flange or collar 29' rigid with the shaft 15.

We claim:

1. In a torque amplifier, a driving shaft, a driven shaft, an input shaft adapted for connection to a source of power to be rotated thereby, a pair of rotatable members to which said input shaft is drivingly connected to rotate them in opposite directions, clutch means for connecting said driven shaft selectively to said members, actuating means responsive to relative rotation of said driving and driven shafts for controlling said clutch means, an abutment member rotatable with said driving shaft and having faces presented in opposite circumferential directions, a pair of abutments located in fixed positions circumferentially of the driving shaft for engagement respectively with said faces to limit rotation of the driving shaft, and means for producing relative movement of said abutment member and said abutments in a direction transverse to the path of circumferential movement of said abutment faces.

2. In a torque amplifier, a driving shaft, a driven shaft, an input shaft adapted for connection to a source of power to be rotated thereby, a pair of rotatable members to which said input shaft is drivingly connected to rotate them in opposite directions, clutch means for connecting said driven shaft selectively to said members, actuating means responsive to relative rotation of said driving and driven shafts for controlling said clutch means, an abutment member rotatable with said driving shaft and having faces presented in opposite circumferential directions, a pair of abutments located in fixed positions circumferentially of the driving shaft for engagement respectively with said faces to limit rotation of the driving shaft, said abutments being located on opposite axial sides of said abutment member and beyond the path of circumferential movement of the abutment faces, said abutment member being axially movable in opposite directions to bring its abutment faces alternatively into opposed relation with said abutments, and means responsive to rotation of the driving shaft for so axially moving the abutment member.

3. In a torque amplifier, a rotatable driven element having in one end an axially opening recess defined by an annular wall provided with an opening, a rotatable control element extending into said recess, a pair of annular rotatable members coaxial with said driven element, means for driving said rotatable members in opposite directions, a pair of selectively operable clutches for drivingly connecting said driven element alternatively to said rotatable members, and clutch-actuating mechanism operable in response to relative rotation of said driven and control elements and including a part extending generally radially through said opening.

4. The invention set forth in claim 3 with the addition that said opening is a slot extending to the open end of said recess.

5. In a torque amplifier, a rotatable driven element supported in fixed axial position, said driven member having an axial recess surrounded by an annular wall provided with a plurality of angularly spaced openings, a pair of rotatable members coaxial with said driven element and adapted for connection to a source of power to be driven in opposite directions thereby, a pair of friction clutches surrounding said annular wall and selectively operable to transmit torque to said driven element from one or the other of said rotatable members, a common pressure-applying member disposed between said clutches and movable in opposite axial directions from a neutral position to control selective operation of the clutches, said pressure-applying member having a plurality of generally radial projections extending respectively into said openings, and actuating means including a control element located within said recess, cooperating with said projections, and rotatable relatively to the driven element for moving said pressure-applying member to effect selective operation of said clutches.

6. In a torque amplifier, a driving shaft, a driven shaft, an input shaft adapted for connection to a source of power to be rotated thereby, a pair of rotatable members to which said input shaft is drivingly connected to rotate them respectively in opposite directions, clutch means for connecting said driven shaft selectively to said members and comprising multiple-disk friction clutches located on and spaced apart along a common axis, and a common pressure plate axially movable in opposite directions to engage one clutch and disengage the other, said pressure plate being rotatable with said driving shaft, a yieldable torque-transmitting connection between said driving and driven shafts, and actuating means responsive to yielding of said connection for controlling said clutch means, said actuating means comprising one or more anti-friction elements received in helical grooves provided in opposed faces of axially co-extensive portions of said driving shaft and presure-plate, said connection being resilient and preloaded, whereby it will not yield under torques below a predetermined minimum.

7. In at torque amplifier, a driving shaft, a driven shaft, an input shaft adapted for connection to a source of power to be rotated thereby, a pair of rotatable members to which said input shaft is drivingly connected to rotate them respectively in opposite directions, friction clutch means for connecting said driven shaft selectively to said members, a yieldable torque-transmitting connection between said driving and driven shafts, and actuating means responsive to yielding of said connection for controlling said clutch means, said actuating means comprising a rotatable control member drivingly connected to one of said driving and driven shafts and movable axially of itself in opposite directions alternatively to engage said clutches, said control member and the other of said driving and driven shafts having opposed helical grooves, and one or more anti-friction elements received in said grooves, said connection being resilient and preloaded whereby it will not yield under torques below a predetermined minimum.

References Cited in the file of this patent

UNITED STATES PATENTS

| 1,168,533 | Meyer | Jan. 18, 1916 |
| 1,324,890 | Glenn | Dec. 16, 1919 |
| 1,355,152 | Laird | Oct. 12, 1920 |
| 1,763,470 | Lemon | June 10, 1930 |
| 2,311,010 | Vickers | Feb. 16, 1943 |
| 2,534,536 | Staude | Dec. 19, 1950 |
| 2,553,795 | Staude | May 22, 1951 |
| 2,587,377 | Penrose | Feb. 26, 1952 |
| 2,744,415 | Gaubatz | May 8, 1956 |

FOREIGN PATENTS

| 597,310 | France | Nov. 18, 1925 |
| 572,934 | Great Britain | Oct. 30, 1945 |